United States Patent [19]

Esparza

[11] Patent Number: 4,702,647
[45] Date of Patent: Oct. 27, 1987

[54] REDUCED J-TUBE PULL FORCE

[75] Inventor: Joe O. Esparza, Katy, Tex.

[73] Assignee: Shell Oil Company, Houston, Tex.

[21] Appl. No.: 904,427

[22] Filed: Sep. 8, 1986

[51] Int. Cl.⁴ .......................... F16L 1/00; B63B 35/04
[52] U.S. Cl. ...................................... 405/169; 72/166;
166/343; 175/7; 405/195
[58] Field of Search ............... 405/195, 168, 169, 170,
405/184; 166/345, 343, 341, 350, 359, 367;
72/166, 167, 41, 462; 175/9, 61

[56] References Cited

U.S. PATENT DOCUMENTS

| | | | |
|---|---|---|---|
| 1,515,894 | 11/1924 | Taylor | 72/166 X |
| 3,293,897 | 12/1966 | Holter | 72/166 X |
| 3,434,296 | 3/1969 | Otterman et al. | 166/343 X |
| 3,650,114 | 3/1972 | Neal | 405/169 X |
| 3,680,342 | 8/1972 | Mott et al. | 72/166 X |
| 3,955,599 | 5/1976 | Walker | 405/169 X |
| 4,095,437 | 6/1978 | Cox | 405/169 X |
| 4,403,890 | 9/1983 | Miyanagi et al. | 405/184 |

Primary Examiner—Dennis L. Taylor

[57] ABSTRACT

A method and apparatus are provided for reducing the force required to move a pipe through a J-tube attached to an offshore platform. The J-tube is provided with at least two spaced-apart sections and at least the pipe and/or one section is oscillated as the pipe is moved through the J-tube, thereby reducing the force required to move the pipe.

12 Claims, 2 Drawing Figures

REDUCED J-TUBE PULL FORCE

BACKGROUND OF THE INVENTION

This invention pertains to the use of J-tubes on offshore platforms for installing pipelines extending upwardly from the seafloor.

In offshore petroleum operations, a platform frequently serves as an operational base and a production terminal for oil and gas wells. A problem common to all such offshore platforms is providing a connection from an above water facility to a pipeline which lies on the seafloor. A typical method of providing the connection is the use of a J-tube riser guide member which is a continuous tubular structure having the shape of a J and through which a riser pipeline is pulled from the seafloor to the above-water facility. This J-tube runs down along the length of the platform, bends near the seafloor and thus runs generally parallel to the seafloor a short distance. The lower end of the J-tube frequently includes a flared portion referred to as a bell mouth. The upwardly pulled pipeline, i.e. the riser, provides a fluid flow path from the above-water facility to the pipeline on the seafloor.

At least two basic methods are known for installing the pipeline riser in the J-tube once the J-tube is positioned. In the so-called J-tube method, the pipeline riser is inserted in the seafloor end of the tube and pulled through it with a cable or other means. In the so-called reverse J-tube method, a section of the pipeline riser is inserted in the deck end of the J-tube and is pulled or pushed down through it as additional sections of conduit are joined to the pipeline riser at the deck. Both of these methods place tension on the riser as it is forced through the J-tube. This tension may cause displacements of the pipeline riser and J-tube which produce stresses that exceed the limits of the materials and cause damage to the pipeline riser or J-tube.

Unfortunately, the J-tube is generally useful for riser pipeline diameters only up to about 12 inches. For riser pipelines having a diameter greater than 12 inches, the high pulling force required to install the pipeline riser is a major deterrent to further use of the J-tube. The J-tube has the advantage of a controlled and simple installation process which does not require elaborate pipeline manipulating equipment, unlike other known installation processes.

Accordingly, it is a purpose of the present invention to provide a J-tube which has all the advantages of the conventional J-tube and which can be utilized with pipeline diameters greater than 12 inches without placing undue stresses upon the pipeline or the J-tube. Other purposes, advantages and features of the invention will be apparent to one skilled in the art upon review of the following disclosure.

This application is relevant to the following copending applications: applications Ser. No. 868,985 filed May 30, 1986; Ser. No. 876,153 filed June 19, 1986; Ser. No. 876,152 filed June 19, 1986, and application Ser. No. 866,658 filed May 27, 1986, is incorporated by reference into the present disclosure.

Applicant is not aware of any prior art references which, in his judgment as one skilled in the pipeline art, would anticipate or render obvious the novel J-tube riser of the instant invention; however, for the purposes of developing the background of the invention and establishing the state of the requisite art, the following are set forth: U.S. Pat. Nos. 4,098,091 and 4,523,877.

SUMMARY OF THE INVENTION

The present invention provides a J-tube through which a pipeline riser can be moved by a reduced force.

Accordingly, the present invention provides a method and apparatus for reducing the force required to move a pipe through a J-tube attached to an offshore platform, comprising providing the J-tube with at least two spaced-apart sections and oscillating at least one of the pipe and the sections as the pipe is moved through the J-tube.

DESCRIPTION OF PREFERRED EMBODIMENTS

In accordance with the present invention a solution is provided to a significant problem which exists on offshore platforms when a pipe is pulled via a J-tube to the top of the platform for a final tie-in. Friction and pull forces exerted are tremendous. Accordingly, the present invention is directed to the need which arises to reduce such forces, thus enabling the pulling of larger diameter pipes. Primarily, the present invention is directed to the modification of the existing conventional J-tubes. The J-tube is provided with spaced-apart sections. One of the sections and/or the riser pipe may be oscillated. A section of the J-tube may be hinged at one or several locations. Oscillation is externally actuated with a hydraulic jack or counterweight means or the like. Rollers may be used in combination with oscillation means and/or J-tube sections. As the pipe in one embodiment is fed into the J-tube riser at the bottom and pulled via a cable from the top of the platform, knee action movement is actuated and the J-tube acts as a bender, nibbler, and come-along, all in one. The movable sections of the J-tube apply lateral bending forces to the riser pipe being pulled into the J-tube which significantly reduces longitudinal pull force. Thus, the invention realizes reduced pull force during installation and reduced residual stress in riser pipe and conduit during operational lifetime.

Figure 1:
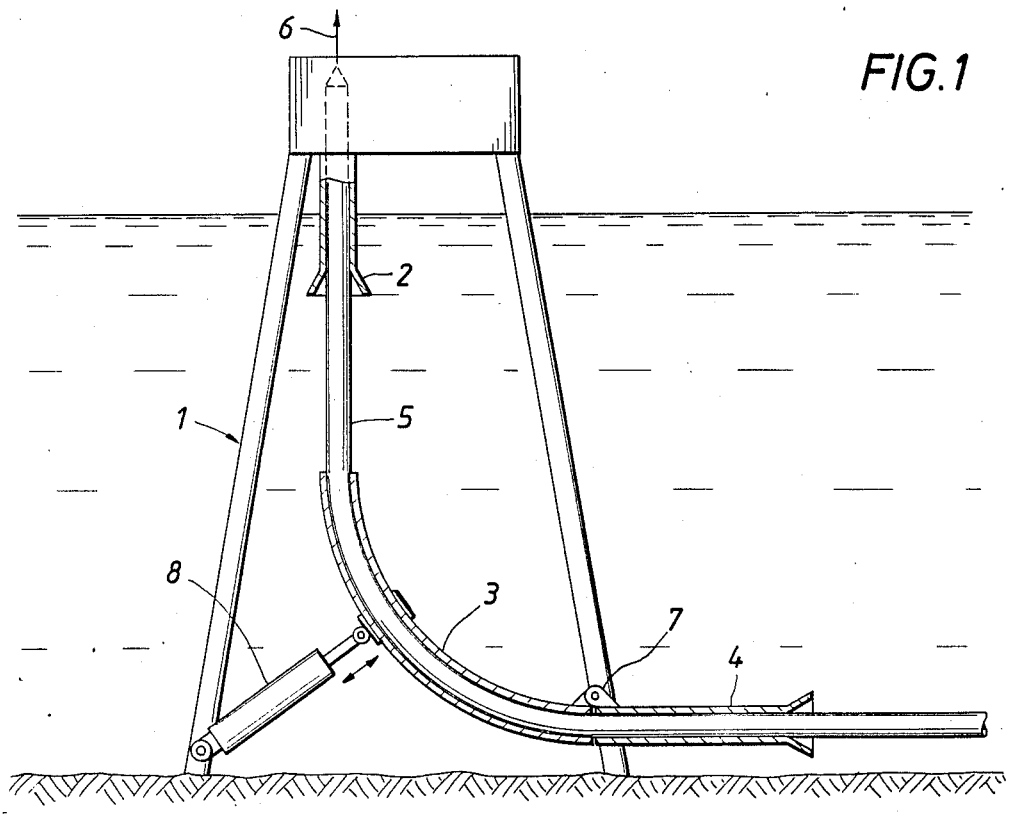
FIG. 1 provides a view of a J-tube having spaced-apart sections with one of the sections being a knee action movable section.

Having thus generally described one embodiment of the invention, the following more particularly describes this and another embodiment of the invention in connection with the accompanying drawings. In FIG. 1 a J-tube is provided to accomplish the benefits of the invention. An offshore platform 1 is provided with J-tube sections 2, 3 and 4 fixed to the platform. Within the J-tube sections is a riser pipe 5 having an attached pull cable 6 at the upper end of which is applied a pull force. Section 3 is connected at its lower end by means of a hinge 7 to section 4, although other attachment means can be provided which will permit section 3 to be movable. A hydraulic jack 8 or other means is employed to give the movable section 3 a cyclic vertical motion, as shown by the double headed arrow.

Figure 2:
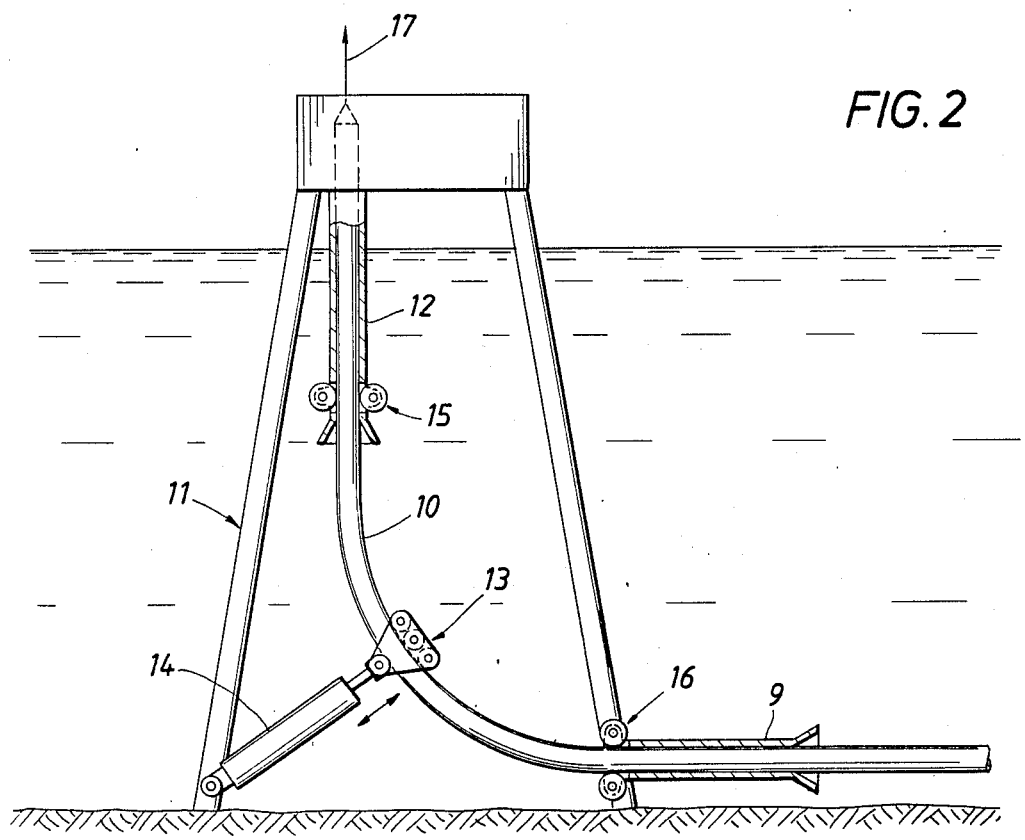
FIG. 2 provides a view of a J-tube with roller means for oscillating a riser pipe.

In FIG. 2 of the drawings another embodiment of the invention is disclosed which involves oscillating the riser pipe. Thus, an offshore platform 11 is provided with a vertical section 12 of J-tube and a lower spaced-apart section 9, with pipe 10 pulled therethrough with pull cable 17. Pipe 10 is connected to rollers 13 which in turn are connected by some means such as a hydraulic jack 14, preferably actuated from above water which produces cyclic motions of pipe 10. Rollers may also be provided in the J-tube sections, e.g. rollers 15 and 16, to ease movement of the pipe 10 therethrough.

The foregoing description of the invention is merely intended to be explanatory thereof. Various changes in the details of the described method and apparatus may be made within the scope of the appended claims without departing from the spirit of the invention. For example, combinations of knee action and pipe action may be employed in the same J-tube riser, and the pipe may be pulled or pushed, or both pulled and pushed, through the J-tube riser from the top and/or bottom.

What is claimed is:

1. A method for reducing the force required to move a pipe through a J-tube attached to an offshore platform, comprising:
    constructing the J-tube of at least two completely spaced-apart sections;
    moving the pipe through the J-tube sections; and
    oscillating at least one member of the pipe and the J-tube sections as the pipe is moved through the J-tube sections, thereby reducing friction between the pipe and at least one of the J-tube sections.

2. The method of claim 1 wherein both one of the J-tube sections and the pipe are oscillated.

3. The method of claim 2 wherein the J-tube comprises at least three sections and a section is oscillated which is hinged to one of the other sections.

4. The method of claim 1 wherein all of the J-tube sections and the pipe are oscillated.

5. The method of claim 1 wherein oscillation of the pipe is conducted with roller means and the pipe is rolled through the roller means.

6. The method of claim 1 wherein at least one of the J-tube sections is provided with rollers operative to reduce the friction associated with movement of the pipe through the J-tube sections.

7. An apparatus for reducing the force required to move a pipe through a J-tube attached; to an offshort platform, comprising:
    means for constructing the J-tube of at least two spaced-apart sections;
    means for moving the pipe through the J-tube sections; and
    means for oscillating at least one member of the pipe and the J-tube sections as the pipe is moved through the J-tube sections.

8. The apparatus of claim 7 wherein means is provided for oscillating both one of the J-tube sections and the pipe, thereby reducing friction between the pipe and at least one of the J-tube sections.

9. The apparatus of claim 7 wherein the J-tube comprises at least three sections and includes means for hinging an oscillated section to one of the other sections.

10. The apparatus of claim 7 including means for oscillating all of the J-tube sections and the pipe.

11. The apparatus of claim 7 wherein the oscillation means is provided with rollers for gripping the pipe.

12. The apparatus of claim 7 wherein at least one of the J-tube sections is provided with rollers operative to reduce the friction associated with movement of the pipe through the J-tube sections.

* * * * *